US008838673B2

(12) United States Patent
Morford

(10) Patent No.: US 8,838,673 B2
(45) Date of Patent: Sep. 16, 2014

(54) METHOD AND APPARATUS TO GENERATE AUDIO VERSIONS OF WEB PAGES

(76) Inventor: Timothy B. Morford, Fultonville, NY (US)

( * ) Notice: Subject to any disclaimer, the term of this patent is extended or adjusted under 35 U.S.C. 154(b) by 2379 days.

(21) Appl. No.: 10/994,681

(22) Filed: Nov. 22, 2004

(65) Prior Publication Data

US 2006/0111911 A1 May 25, 2006

(51) Int. Cl.
*G06F 15/16* (2006.01)
*G10L 13/04* (2013.01)

(52) U.S. Cl.
CPC .................................... *G10L 13/043* (2013.01)
USPC ........................................... 709/203; 709/206

(58) Field of Classification Search
USPC .................................................. 709/203, 206
See application file for complete search history.

(56) References Cited

U.S. PATENT DOCUMENTS 6,418,199 B1 * 7/2002 Perrone ...................... 379/88.01
6,513,003 B1 1/2003 Angell et al.
6,587,822 B2 7/2003 Brown et al.
6,721,781 B1 * 4/2004 Bates et al. .................... 709/203
6,732,142 B1 * 5/2004 Bates et al. .................... 709/203
7,000,189 B2 * 2/2006 Dutta et al. ................... 715/727
7,216,287 B2 * 5/2007 Colson et al. ................. 715/239
7,277,916 B2 * 10/2007 Nuestro ........................ 709/203
2001/0056351 A1 12/2001 Valentine et al.
2003/0055884 A1 3/2003 Yuen et al.
2003/0158957 A1 8/2003 Abdolsalehi

OTHER PUBLICATIONS

"My Talking Website", MultiMedia Pros, http://mediaman.com/talkingwebsite.htm, (Dec. 20, 2004).
"Browsealoud", Kirklees Council West Yorkshire, Web Development Team—Jul. 2004, http://www.kirkleesmc.gov.uk/answers/users-quide/browsealoud.shtml, (Dec. 20, 2004).
"Talking Websites", http://www.talkingwebsites.co.uk/, (Dec. 10, 2004).

(Continued)

*Primary Examiner* — Yves Dalencourt
(74) *Attorney, Agent, or Firm* — Fox Rothschild LLP; Gerard P. Norton

(57) ABSTRACT

Audio files corresponding to a web page are generated by filtering a web page to remove characters that are non-audible. The audio files can be generated by a first server that receives a request for a web page or can be generated by a second server operating in cooperation with the first server. Additionally, web pages can be provided with a read me command button or other control object to allow audio versions of the web page to be selectively presented to a client terminal where the user desires to hear an audio version of the web page. Further, servers may maintain play lists of web pages, including audio versions thereof if desired. Some servers may maintain a preference list of web pages that users would like to hear audio versions of.

9 Claims, 20 Drawing Sheets

(56) References Cited

OTHER PUBLICATIONS

Daniels, Jim , "Talking Websites, Trend or Necessity?", *Biz Web E-Gazette,* http://www.bizweb2000.com/gazette/audio.html, (Jan. 15, 2004).
"Audio Commentary", http://www.ik.com/is_audiocommentary.lkml, (Dec. 20, 2004).
"Boost Sales By Breaking The Silence of the Web!", http://audiogenerator.add2it.com, (Dec. 20, 2004).
"Streaming Audio Solutions from Amazing Talking Wesites", http://www.amazingtalkingwebsites.com, (Dec. 20, 2004).
"Websites My Way Guides—Hi Visibility and Talking Browsers", http://www.abilitynet.org.uk/myweb/browser/talk/hi-viz-browser.htm, (Dec. 20, 2004).
"AudioLink It Speaks", http://www.audiolink.com/home.html, (Dec. 20, 2004).
"Easily Put Streaming Audio on Your Website", *Web Audio Software Review*—by Reviewstar.com, http://www.web-audio-reviews.com, (Dec. 20, 2004).
"The Visually Disabled and The Internet", *Sensus Internet Browser,* http://www.sensus.dk/sib10uk.htm, (Dec 20, 2004).
"Voice Adds Life to Your Website and Email", *Excite Audio,* http://www.exciteaudio.com/?source-overture, (Dec. 20, 2004).
"Voicemail Greeting" Ives Creative, http://www.ivescreative.com, (Dec. 20, 2004).
"Eidoserve", eidoserve, http://www.eidoserve.com, (Feb. 15, 2005).

* cited by examiner

FIG. 8

```
<html>
<head>
<title>See Spot Run</title>
</head>
<body>
<TABLE>
     <TR>
          <TD>
               See Spot Run!
          </TD>
     </TR>
     <TR>
          <TD>
               <A HREF="home.HTML">Home Page</A> |
               <A HREF="Directions.HTML">Find
us!</A> |
               <A HREF="Contact.html">Contact Us</A> |
          </TD>
     </TR>
     <TR>
          <TD>
               See Spot run! See Spot play!
          </TD>
     </TR>
     <TR>
          <TD>
               <CENTER>Copyright 1963 Spot
Media&copy</CENTER>
          </TD>
     </TR>
</TABLE>
</body>
</html>
```

FIG. 9

```
<html>
<head>
<title>See Spot Run</title>
</head>
<body>
<embed src="1.wav">
<TABLE>
     <TR>
          <TD>
               See Spot Run!
          </TD>
     </TR>
     <TR>
          <TD>
               <A HREF="home.HTML">Home Page</A> |
               <A HREF="Directions.HTML">Find
us!</A> |
               <A HREF="Contact.html">Contact Us</A> |
          </TD>
     </TR>
     <TR>
          <TD>
               See Spot run! See Spot play!
          </TD>
     </TR>
     <TR>
          <TD>
               <CENTER>Copyright 1963 Spot
Media&copy</CENTER>
          </TD>
     </TR>
</TABLE>
</body>
</html>
```

METHOD AND APPARATUS TO GENERATE AUDIO VERSIONS OF WEB PAGES

BACKGROUND OF THE INVENTION

The present invention relates to method and apparatus for presenting audio versions of web pages. It also relates to method and apparatus for presenting audio versions of web pages on a variety of client terminals.

Web pages are normally generated by servers, provided to client terminals and are read by users on the client terminals. While the web pages on the internet provide a wealth of information, those web pages typically must be read by the user. It would be more convenient if a user at a client terminal could have the option of accessing the information in alternative ways. For example, it would be advantageous if the user at the client terminal could hear the web page being spoken as well as being able to read the web page. Thus, it would be advantageous if web pages could be presented to client terminals in audio form. It would be even more advantageous if the user at the client terminal could select the mode of accessing the information.

Technically savvy users can implement text to speech converters to have portions of web pages read on their personal computers. But these solutions, to the extent they exist, are based on a client side implementation. An architecture that would minimize the needs imposed on the client terminal and on the user of the client terminal would, therefore, make the experience for the user easier and more enjoyable.

It is also presently inconvenient for a user to search a pre-selected list of web pages. Users must now go through a list of web pages and individually access those web pages. This takes the user's time. It would be advantageous to provide method and apparatus to make this process easier for a user.

Accordingly, new and improved methods and apparatus for accessing web pages are needed.

SUMMARY OF THE INVENTION

In accordance with one aspect of the present invention, a server process for providing a web page requested by a client terminal is provided. The process includes the steps of receiving a request for a web page and then accessing the web page, generating a text version of the web page by filtering the web page to remove non-audible information and then generating an audio file from the text version of the web page.

The present invention also includes the step of transmitting the audio file from the server to the client terminal. In accordance with one aspect of the present invention, the audio file is encoded on the web page. In accordance with a preferred embodiment of the present invention, the encoding is accomplished by finding a selected HTML tag on the web page and replacing the HTML tag with a string that includes a reference to the audio file and the HTML tag.

In accordance with another aspect of the present invention, the connection speed of the client terminal is determined. The encoding of the audio file is preferably accomplished in accordance with the connection speed.

In accordance with another aspect of the present invention, the audio file is generated by a text to speech converter.

In accordance with a further aspect of the present invention, the server processes the text version of the web page to identify and replace pre-selected words that are known to cause difficulties in the test to speech converter.

In accordance with another aspect of the present invention, the audio file is a .wav file, a .mp3 file, or a .wmp file.

These aspects of the present invention are preferably implemented in a server through a server process.

In accordance with another aspect of the present invention, a new communication system and a method of communicating on the internet is provided. In accordance with the method, a client terminal, a first server and a second server, communicate with each other. The client terminal sends a request for a web page and the first server receives the request for the web page. The first server sends a request for an audio version of the web page to the second server. The second server receives the request for the audio version of the web page. The web page and an audio version of the web page are generated by either the first server or the second server and sent to the client terminal.

In accordance with another aspect of the present invention, the first server generates the web page and sends it to the client terminal and the second server generates the audio version of the web page and sends it to the client terminal.

In accordance with another aspect of the present invention, the second server generates the web page and the audio version of the web page and sends it to the client terminal.

In accordance with a further aspect of the present invention, the audio version of the web page is encoded in the web page.

In accordance with another aspect of the present invention, the web page and the audio version of the web page are transmitted separately to the client terminal.

In accordance with another aspect of the present invention, the second server generates the audio version of the web page and sends it to the first server and the first server generates the web page and sends the web page and the audio version of the web page to the client terminal.

In accordance with yet another aspect of the present invention, a method and system of processing an HTML file is provided. The HTML file includes a plurality of pairs of HTML tags, each of the plurality of pairs of HTML tags having a front tag and an associated back tag. The method includes string searching the HTML file to find matches to any of the front tags of the plurality of pairs of HTML tags. When any of the of the plurality of pairs known HTML tags is found, (1) the strings in the HTML file representing HTML tags are replaced with a null string and (2) the characters found between the front tag and the associated back tag are analyzed to determine whether the characters represent text information or non-text information, and if the characters represent non-text information, the characters in the HTML file are replaced with null characters.

In accordance with a further aspect of the present invention, a method of presenting audio versions of web pages from a server to users on a client terminal is provided. The method includes the step of generating a web page, the web page having a control object that can be selected by the user of the client terminal. When the control object is selected by the user, a request is transmitted to the server for an audio version of the web page. When the request is received by the server, an audio file is generated that is the audio version of the web page. Then, the audio file is transmitted from the server to the client terminal and the audio file is run on the client terminal.

The control object is preferably a command button.

In accordance with another aspect of the present invention, a server process in communication with a memory containing a list of a plurality of users and of a plurality of URLs associated with each of the plurality of users, and in communication with a plurality of client terminals, is provided. The process receives a request from one of the plurality of client terminals. The request identifies one of the plurality of users and requests receipt of play list of web pages. The process accesses the list to identify the one of the plurality of users associated with the request and to identify the URLs associated with the one of the plurality of users. The process generates each of the web pages identified by the URLs associated with the one of the plurality of users and transmits each of the web pages to the client terminal that sent the request.

The process can also generate an audio version of each of the web pages. The audio version of each of the web pages is transmitted to the client terminal that sent the request. The audio version can be encoded into the web page before transmission to the client terminal that sent the request.

In accordance with a further aspect of the present invention, another server process in communication with a plurality of client terminals is provided. The process stores a list of a plurality of users and, for each of the plurality of users, a list of associated URLs. It receives a request from one of the plurality of client terminals. The request identifies one of the plurality of users and identifies the URL of a web page. The process accesses the list of a plurality of users to identify the one of the plurality of users associated with the request and to determine whether the URL is associated with the one of the plurality of users. The process then generates the web page identified by the URL. It also generates an audio version of the web page identified by the URL. The process transmits the web page and the audio version of the web page to the client terminal that sent the request.

Accordingly, it is an object of the present invention to present audio versions of web pages at client terminals. This can be done by either presenting audio files alone, audio files embedded in or encoded in web pages or audio files in combination with web pages.

It is a further object of the present invention to provide server processes that receives requests for web pages and provides audio versions of the web pages to client terminals.

It is another object of the present invention to provide processing techniques to generate audio versions of web pages.

It is also an object of the present invention to provide a command button on a web page that allows an audio version of the web page to be presented at a client terminal.

It is a further object of the present invention to provide a server that stores preferences for a plurality of users that indicates which URLs each user would like to access with an audio file.

It is another object of the present invention to provide a server that stores a play list of web pages for a plurality of users so that when the user requests the server, the web pages, along with audio files representative of the web pages, are presented in order with the play list to the user.

These and other objects of the present invention are further described with respect to the following drawings and the description of a preferred embodiment.

DESCRIPTION OF THE DRAWINGS

FIGS. 8 and 9 illustrate an original web page and a encoded web page.

DESCRIPTION OF A PREFERRED EMBODIMENT

Figure 1:
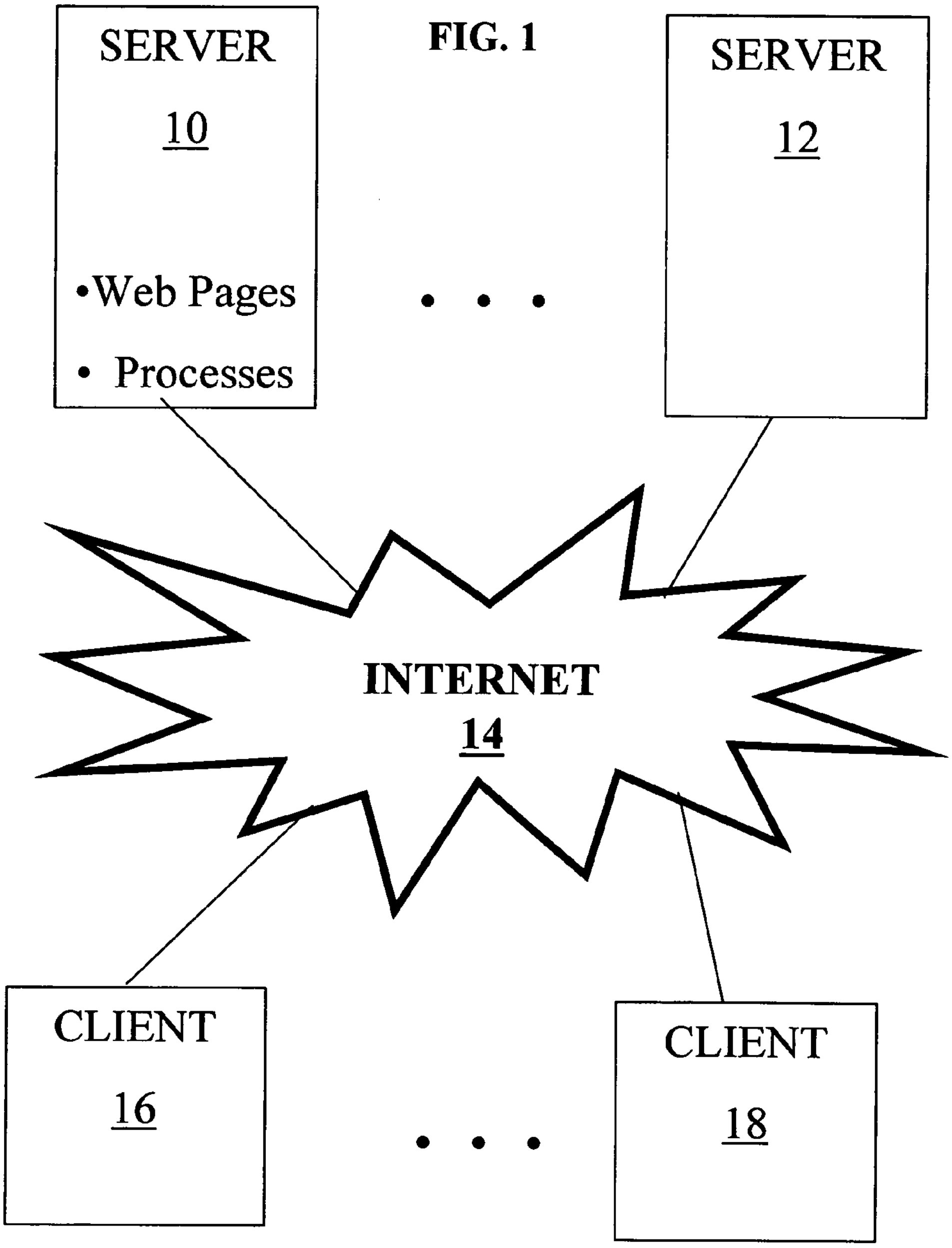
FIG. 1 is a block diagram illustrating a first aspect of the present invention.

Referring to FIG. 1, a block diagram in accordance with a preferred embodiment of the present invention is illustrated. A plurality of servers, including the servers 10 and 12, communicate over the Internet 14 with a plurality of client terminals, including the clients 16 and 18. The communications are provided via well known internet protocols.

As is well known, the server 10 can access a plurality of web pages and can implement a plurality of server processes. The server processes are software programs that perform operations needed to run the server 10. The other servers, such as server 12, also can access a plurality of web pages and can implement a plurality of processes. As is well known, clients request web pages from servers, the servers generate the web pages, send the requested web pages to the client making the request, and the web page is viewed on the client terminal.

In accordance with one aspect of the present invention, audio versions of web pages are generated by a server and are sent to a client terminal so that the text on the web page can be heard on the client terminal. A reference to the generated audio versions are encoded into the web page before the web page is sent to the client terminal.

In accordance with one embodiment of the present invention, the client terminal 16 could identify a web page to the server 10 that the user of the client terminal wants to read. The server 10 could be a server provided by any company, such as AOL, MSN, Yahoo or Google. The server 10 will generate the web page in accordance with standard techniques well known to those of ordinary skill in the art and, in accordance with one aspect of the present invention, generate an audio version of the web page. The server 10 can either encode a reference to the audio version of the web page into the web page and send an associated audio file to the client terminal, or can transmit the web page and the audio version of the web page separately. In accordance with a preferred embodiment of the present invention, the server 10 encode the reference to the audio version of the web page into the web page and sends an associated audio file to the client terminal.

Figure 2:
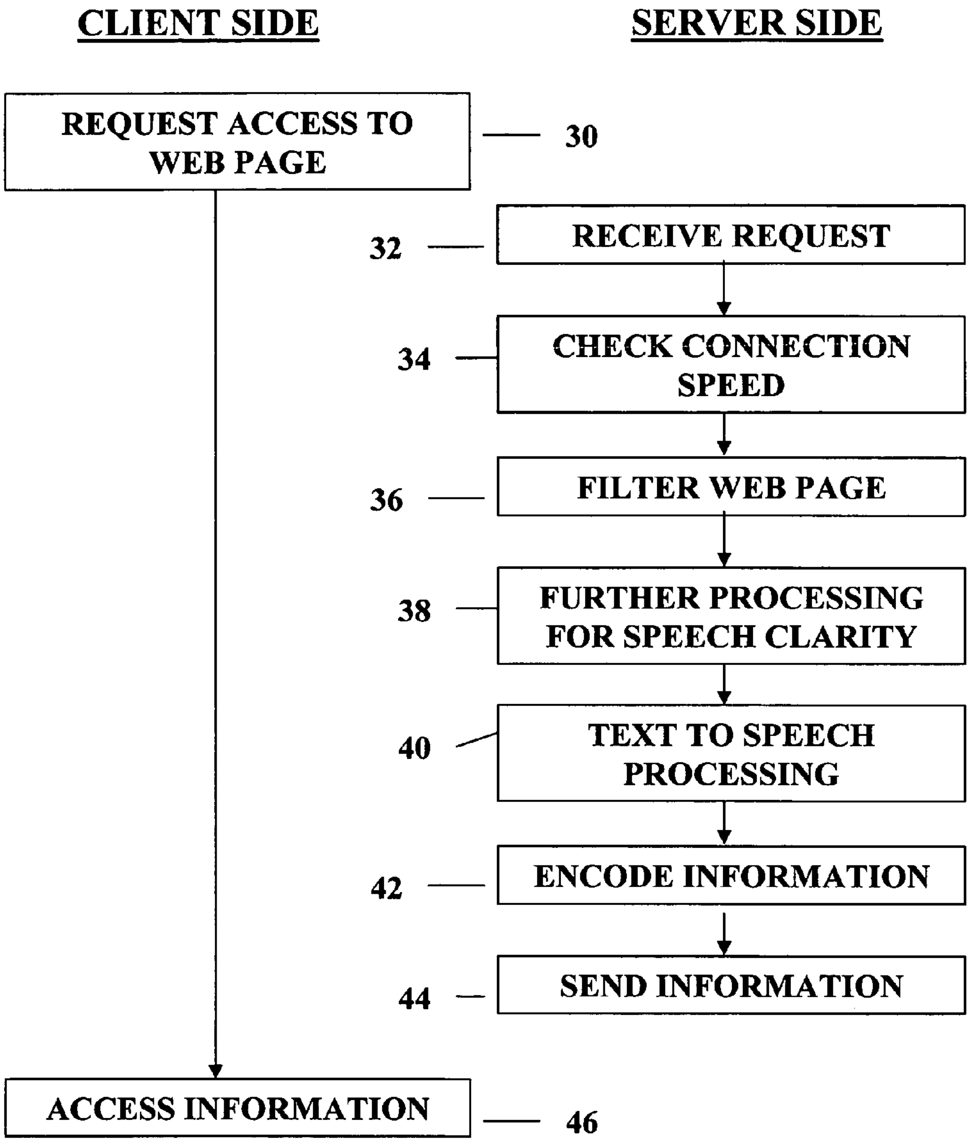
FIG. 2 illustrates the client side and server side processes in accordance with a preferred embodiment of the present invention.

Referring to FIG. 2, the process performed by the client terminal 16, referred to as the client process, and the process performed by the server 10, referred to as the server process, in implementing the scenario described in the preceding paragraph are illustrated. In step 30, the client terminal 16 requests access to a web page. The request is sent to the server 10.

In step 32, the server 10 receives the request. In accordance with a preferred embodiment of the present invention, in step 34, the server 10 checks the connection speed of the client terminal 16. The server 10 performs this step by preferably checking a cookie. This step is described in greater detail with respect to FIGS. 3 and 4.

The server 10, in response to the request from the client terminal 10 for a specific web page, generates the web page. The server 10 also must generate an audio version of the web page in accordance with the present invention. To do so in accordance with a preferred embodiment of the present invention, in step 36, the server 10 filters the generated web page. The generated web page typically consists of HTML code that specifies text information, pictures and other graphical information as well as linking information. To filter the web page, the server 10 accesses the HTML code to remove characters in the HTML code that generate information that is non-audible. For example, characters that relate to pictures or graphics and the HTML tags themselves are removed. This process will be explained in greater detail with respect to FIG. 5. In summary, in step 36, non-audible information is removed from the web page.

In step 38, the server 10 further processes the web page. In step 38, the remaining information in the web page, which includes characters that represent audible information, is searched for words that are known to create enunciation problems in later steps where a text to speech converter is used. Each text to speech converter has words that are known to create problems for the converter. Thus, a listing of words is generated in step 38, the words in the list depending on which text to speech converter is used. When a word is encountered in the web page that is known to create a problem for the text to speech converter, the word is modified in the web page prior to conversion to speech. This step therefore improves the quality of the audio file that will be generated.

In step 40, the filtered and processed web page containing audible information is passed through a text to speech processor. Any of the known text to speech processors can be used. For example, Dragon's or and Microsoft's speech API (SAPI) can be used. The step 40 generates an audio version of the web page that has been filtered and processed. The audio version may be a .wav file which is a well known audio file format. The audio version of the web page may also be generated in any number of other file formats, including a .mp3 file, a .wpm file, a mid file, a .wma file or a .ra file.

In step 42, the audio version of the web page is encoded into the web page. Specifically, a reference to the audio version of the web page, is placed into the associated web page. For example, if the audio version of the web page is a .wav file, such as audio.wav, then the server in step 42 places a reference to audio.wav in the web page. In accordance with a preferred embodiment of the present invention, this is accomplished by string searching the original web page for a known HTML tag and replacing the original HTML tag with a designation identifying a file containing the audio version of the web page and the original HTML tag.

In step 44, the server 10 transmits the web page having the encoded identification of the audio version of the web page. The server 10 also transmits the audio version of the web page with the encoded web page to the client terminal. Thus, the client terminal is provided with all of the information it needs to both display the web page and play the audio version of the web page. The server 10 transmits the web page and the audio version of the web page (such as an audio file) to the client terminal in accordance with established web protocols and well known techniques. Typically, the web page and the audio file are packaged into a single file and transmitted by the server 10 to the client terminal.

In step 46, the client terminal 16 receives the information from the server 10. The information includes the encoded web page and the audio file that represents the audio version of the web page. As previously mentioned, the web page and the audio file are combined into a single file and the client terminal unpacks the information in the single file in accordance with well known techniques. In step 46, a browser on the client terminal 16 displays the web page in accordance with well known techniques. When the browser causes the web page to be displayed, it reads the audio file information encoded in the web page, and causes the audio file to be played when the web page is displayed. This occurs when the client terminal 16 reads the encoded web page and finds the reference to the audio file in accordance with well known techniques. The client terminal 16 then accesses the audio file identified in the web page and causes the audio file to be played.

Figure 3:
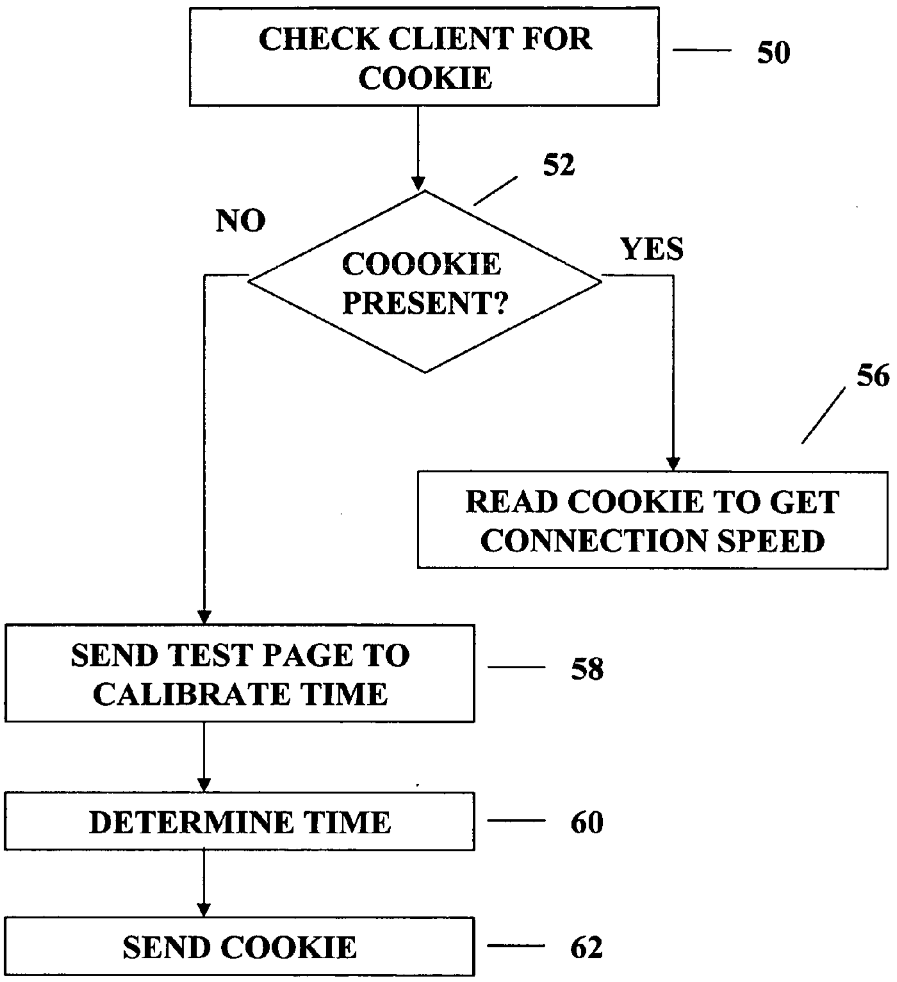
FIG. 3 illustrates the steps used in a preferred embodiment of the present invention to check the connection speed of a client terminal.

Referring to FIG. 3, a method in accordance with a preferred embodiment of the present invention of checking the connection speed of a client terminal 16 at a server 10 is illustrated. In step 50, the server 10 sends a command to the client terminal 16 to see if a certain cookie is present at the client terminal 16. The cookie that the server 10 is looking for is one that the server 10 has previously generated to designate the connection speed of the client terminal 16. In step 52, the client terminal 16 indicates whether the cookie is present on the client terminal 16. If the cookie is found, in step 56, the server 10 accesses the cookie and determines the connection speed of the client terminal 16.

If the cookie is not found, then in step 58, the server 10 sends a test picture to the client terminal 16. The test picture can be any picture of a known size. In accordance with a preferred embodiment, the test picture is a blank picture having a 100 kbit size. The amount of time the client terminal 16 takes to download the test picture will determine the connection speed of the client terminal 16. In step 60, the server 10 measures the amount of time it takes for the client terminal 16 to download the test picture, and then determines the connection speed in accordance with the measured time. The server 10 also generates a cookie that includes the connection speed of the client terminal 16. In step 62, the server 10 sends the cookie to the client terminal 16. The next time the server 10 communicates with the client terminal 16, the cookie will be present to instruct the server 10 as to the client terminal's connection speed.

If the client terminal 16 has disabled the downloading of cookies, then the server 10 can simply assign a slow connection speed to the client terminal 16. All future communications with the client terminal 16 would be made with the assumption that the connection speed is slow. Alternatively, the server 10 could advise the client terminal 16 via a pop-up window that a cookie should be downloaded and allow the user at the client terminal 16 to decide how to proceed.

Figure 4:
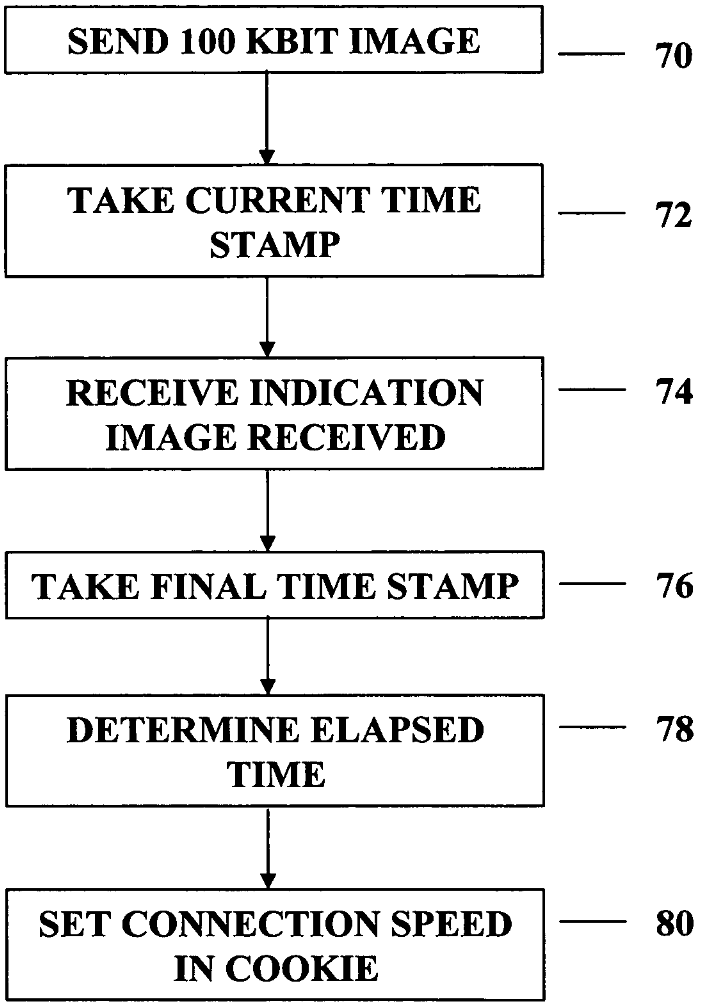
FIG. 4 illustrates the several of the steps of FIG. 3 in greater detail.

FIG. 4 illustrates several of the steps of FIG. 3 in greater detail. In step 70, the server 10 has sent the 100 kbit test image to the client terminal 16. In step 72, the server 10 takes a time stamp when it sends the test image. In step 74, the server 10 receives an indication from the client terminal 16 that it has received the test image. In step 76, the server 10 takes a second time stamp when the client terminal 16 has indicated that it received the test image. In step 78, the server subtracts the first time stamp from the second time stamp to determine the elapsed time. It step 80, the server 10 determines the connection speed of the client terminal 16, and sets that connection speed indicator in a cookie prior to transmitting the cookie to the client terminal 16.

Figure 5:
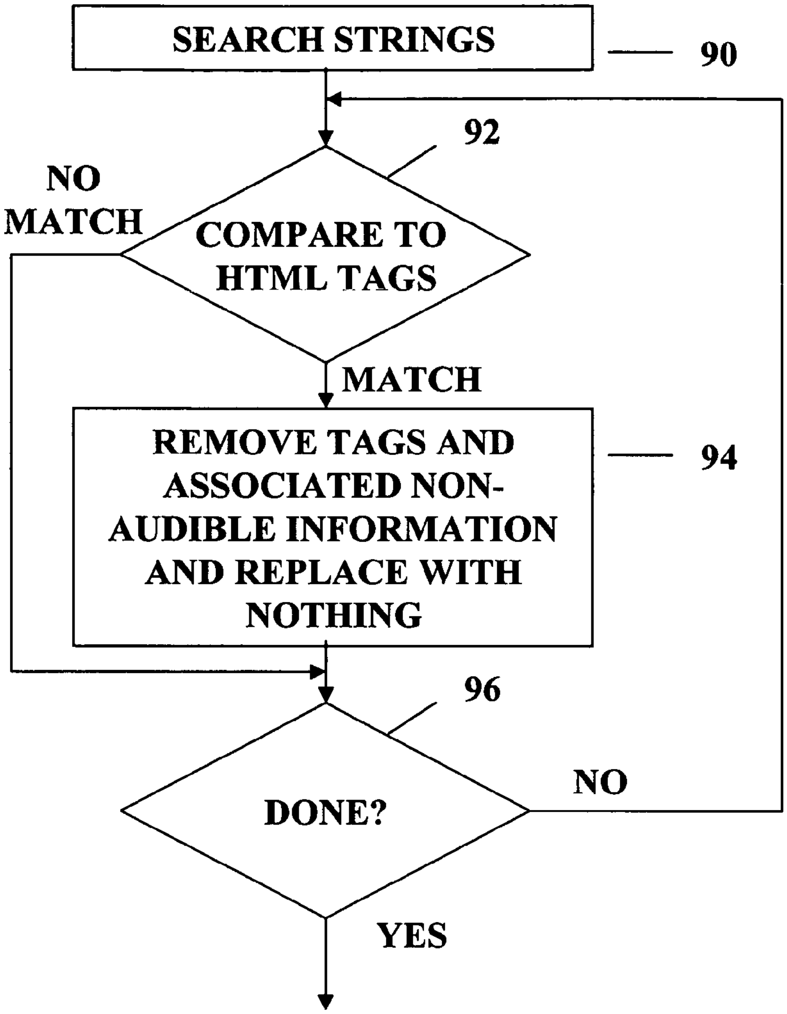
FIG. 5 illustrates the steps used in a preferred embodiment of the present invention to filter web pages.

FIG. 5 illustrates the step 36 of FIG. 2 in greater detail. In step 36, the web page to be view is filtered to remove non-audible strings of information. In step 90, the strings in the web page are searched.

Web pages are normally constructed from HTML tags as well as characters that represent words, pictures, other graphics and links. In step 92, the strings from the web page are compared to all known HTML tags. This process continues until all of the characters in the web page file have been searched.

HTML tags include a front tag and a back tag that occur in pairs. For example, there are a pair of tags that indicate the body of a web page. The front tag is <BODY> and the back tag is </BODY>. When a match occurs, that is, when a string of characters in the web page matches a known HTML code, then the server 10 examines all of the characters found between the front tag and the back tag. The server 10 determines whether the characters between the front tag and the back tag contain audible information. In step 94, any characters that do not represent audible information are removed. Thus, all pictures and graphics are removed. Any scripts and attached files are also removed. Textual characters and links are not removed. Also in step 94, the HTML tags, including the front and rear tags, are removed.

The code that performs the removal of HTML tags is a search and replace routine. The code searches for the tags and replaces them with a null string (“ ”). Different routines can be used to perform this task, as search and replace routines are well known. Code that implements a function to perform this task, that is to remove all HTML tags, in accordance with a preferred embodiment of the present invention is set forth below:

```
Function RemoveHTML( strText )
   Dim nPos1
   Dim nPos2
   nPos1 = InStr(strText, “<”)
   Do While nPos1 > 0
      nPos2 = InStr(nPos1 + 1, strText, “>”)
      If nPos2 > 0 Then
         strText = Left(strText, nPos1 − 1) & Mid(strText, nPos2 + 1)
      Else
         Exit Do
      End If
      nPos1 = InStr(strText, “<”)
   Loop
   RemoveHTML = strText
End Function
```

The previous code searches for the HTML tag designators, and uses the Left and Mid string instructions to remove tags and undesired code. Another function that removes all HTML using regular expressions is set forth below:

```
Function RemoveHTML( strText )
      Dim RegEx
      Set RegEx = New RegExp
      RegEx.Pattern = “<[^>]*>”
      RegEx.Global = True
   RemoveHTML = RegEx.Replace(strText, “”)
End Function
```

The following code can be used to remove only selected HTML tags;

```
Function RemoveHTML( strText )
   Dim TAGLIST
   TAGLIST = “;!--
;!DOCTYPE;A;ACRONYM;ADDRESS;APPLET;AREA;B;BASE;BASEFONT;”
&_
“BGSOUND;BIG;BLOCKQUOTE;BODY;BR;BUTTON;CAPTION;CENTER;CITE;
CODE;” &_
“COL;COLGROUP;COMMENT;DD;DEL;DFN;DIR;DIV;DL;DT;EM;EMBED;FIELD
SET;” &_
“FONT;FORM;FRAME;FRAMESET;HEAD;H1;H2;H3;H4;H5;H6;HR;HTML;I;IFRAME;
IMG;” &_
“INPUT;INS;ISINDEX;KBD;LABEL;LAYER;LAGEND;LI;LINK;LISTING;MAP;MARQUEE;”
&_
“MENU;META;NOBR;NOFRAMES;NOSCRIPT;OBJECT;OL;OPTION;P;PARAM;PLAINTEXT;”
&_
“PRE;Q;S;SAMP;SCRIPT;SELECT;SMALL;SPAN;STRIKE;STRONG;STYLE;SUB;SUP;”
&_
“TABLE;TBODY;TD;TEXTAREA;TFOOT;TH;THEAD;TITLE;TR;TT;U;UL;VAR;WBR;
XMP;”
   Const BLOCKTAGLIST =
“;APPLET;EMBED;FRAMESET;HEAD;NOFRAMES;NOSCRIPT;OBJECT;SCRIPT;STYLE;”
   Dim nPos1
   Dim nPos2
   Dim nPos3
   Dim strResult
   Dim strTagName
   Dim bRemove
   Dim bSearchForBlock
   nPos1 = InStr(strText, “<”)
   Do While nPos1 > 0
```

-continued

```
        nPos2 = InStr(nPos1 + 1, strText, ">")
        If nPos2 > 0 Then
            strTagName = Mid(strText, nPos1 + 1, nPos2 − nPos1 − 1)
            strTagName = Replace(Replace(strTagName, vbCr, " "), vbLf, " ")
            nPos3 = InStr(strTagName, " ")
            If nPos3 > 0 Then
                strTagName = Left(strTagName, nPos3 − 1)
            End If
            If Left(strTagName, 1) = "/" Then
                strTagName = Mid(strTagName, 2)
                bSearchForBlock = False
            Else
                bSearchForBlock = True
            End If
            If InStr(1, TAGLIST, ";" & strTagName & ";", vbTextCompare) > 0 Then
                bRemove = True
                If bSearchForBlock Then
                    If InStr(1, BLOCKTAGLIST, ";" & strTagName & ";",
vbTextCompare) > 0 Then
                        nPos2 = Len(strText)
                        nPos3 = InStr(nPos1 + 1, strText, "</" & strTagName,
vbTextCompare)
                        If nPos3 > 0 Then
                            nPos3 = InStr(nPos3 + 1, strText, ">")
                        End If
                        If nPos3 > 0 Then
                            nPos2 = nPos3
                        End If
                    End If
                End If
            Else
                bRemove = False
            End If
            If bRemove Then
                strResult = strResult & Left(strText, nPos1 − 1)
                strText = Mid(strText, nPos2 + 1)
            Else
                strResult = strResult & Left(strText, nPos1)
                strText = Mid(strText, nPos1 + 1)
            End If
        Else
            strResult = strResult & strText
            strText = ""
        End If
        nPos1 = InStr(strText, "<")
    Loop
    strResult = strResult & strText
    RemoveHTML = strResult
End Function
```

The tags that can be left in are designated by the BLOCKTAGLIST. It is, however, preferred to remove all HTML tags.

FIG. 5 illustrates the step 38 of FIG. 2 in greater detail. When step 38 is performed, the filtered web page has had all characters representing non-audible information removed. Step 38 further processes the filtered web page to find words that create known problems with whatever text to speech converter is being used.

Every commercially available text to speech converter has certain words that create problems. These words are known, and the server 10 maintains a list of these words. The words in the list will vary depending on which text to speech converter is used.

Figure 6:
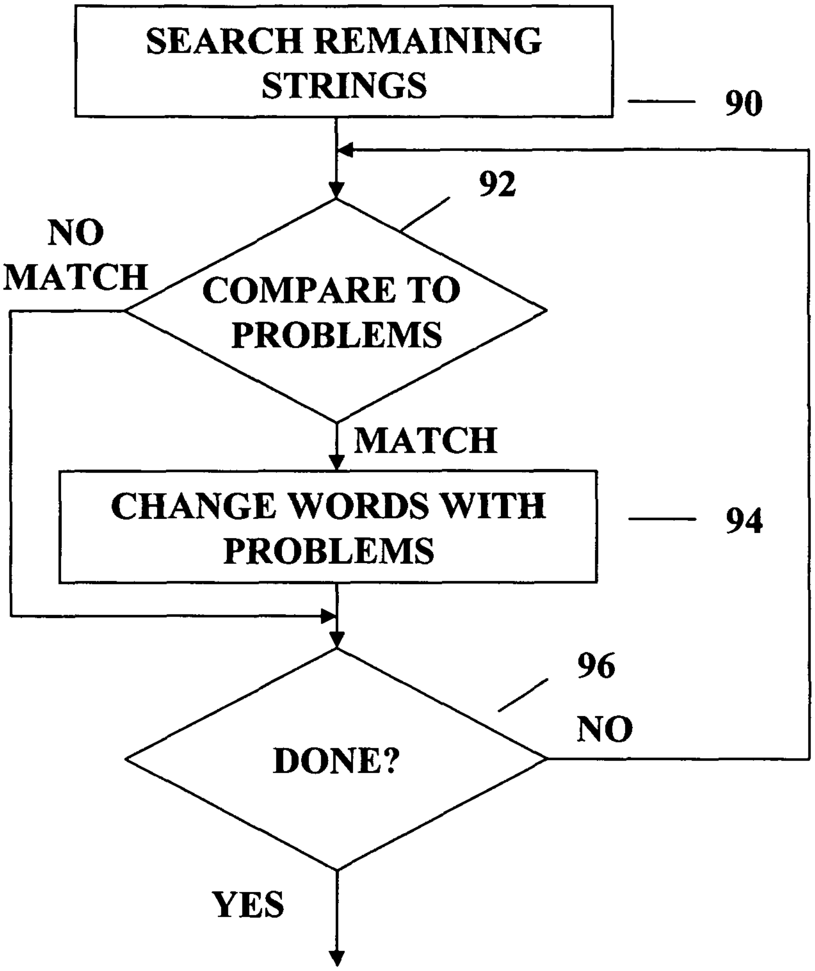
FIG. 6 illustrates the steps used in a preferred embodiment of the present invention to further process the filtered web pages.

Referring to FIG. 6, in step 90, the server 10 searches the strings that remain in the filtered web page. In step 92, the strings are compared to the known problem words. When there is a match, in step 94, the words with known problems are changed to alleviate the problem. When all of the strings have been checked, in step 96, the server 10 moves to the next step.

The code to perform this task in accordance with a preferred embodiment of the present invention is set forth below, although other code routines can be used.

```
Function CheckEnunciation(strText)
Dim Connection
Dim SQL
Dim objRS
Set Connection = Server.CreateObject ("ADODB.Connection")
Connection.ConnectionString = Session ("DataConn_ConnectionString")
Connection.CursorLocation = 3        ' adUseClient
Connection.Open
SQL = "SELECT Correct FROM Enunciation WHERE word = '" &
strText & "'"
set objRS = Connection.execute(SQL)
if not(objRS.BOF) and Not(objRS.EOF) THEN
    CheckEnunciation = objRS("Correct")
else
    CheckEnunciation = strText
End if
objRS.close
connection.close
set objRS = Nothing
Set connection = nothing
End function
```

Figure 7:
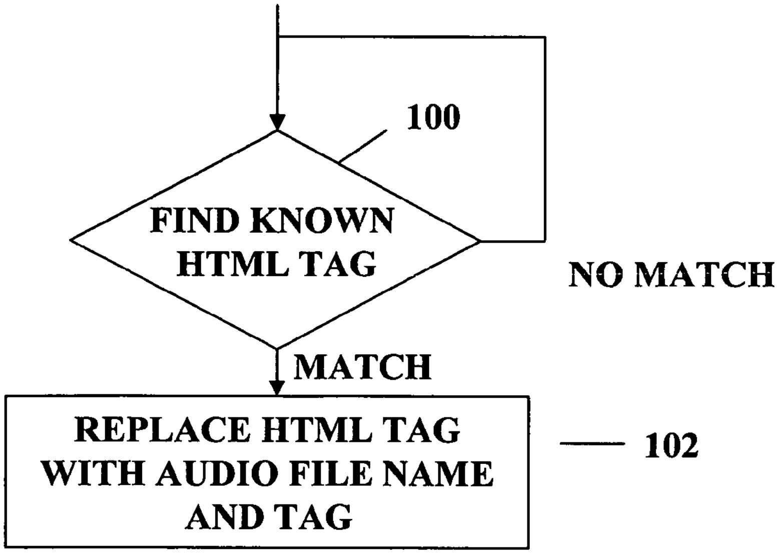
FIG. 7 illustrates the steps used to encode audio information into a web page in accordance with a preferred embodiment of the present invention.

FIG. 7 illustrates the step 42 of FIG. 2 in greater detail. In this step, the audio version of the web page is encoded onto the web page for transmission to the client terminal 16. In step 100, the server 10 searches the original web page for a preselected HTML tag. For example, the server 10 can string search the web page for the <HTML> tag.

When the preselected HTML tag is found in the original web page, in step 102, the server 10 replaces the HTML tag in the web page with the name of the audio file and also puts the HTML tag back in the web page.

The following code implements the steps of FIG. 2, including obtaining the web page, cleaning or filtering the text stream, checking enunciation, creating the .wav file and saving the audio file to a location accessible to the server and in the database for further access. It also returns the web to the server or to the user.

```
Response.Buffer = false
    Dim objXMLHTTP
    Dim xml
    Dim Connection
    Dim SQL
    Dim objRS
    Dim strImages
    Dim strURL
    Dim strClean
    Dim strPage
    Dim flAudio
    strURL = request(“URL”)
    Set xml = Server.CreateObject(“Microsoft.XMLHTTP”)
    xml.Open “GET”, strURL, False
    xml.Send
    strClean = RemoveHTML(xml.responseText)
    strPage = xml.responseText
    Set xml = Nothing
    Set Connection = Server.CreateObject (“ADODB.Connection”)
    Connection.ConnectionString = Session (“DataConn_ConnectionString”)
    Connection.CursorLocation = 3        ‘ adUseClient
    Connection.Open
    SQL = “SELECT audio FROM NAH WHERE URL = ‘“ & strURL & ”’ AND
URLText = ‘“
& strClean & ”’”
    set objRS = Connection.execute(SQL)
    if not(objRS.EOF) and not(objRS.BOF) then
      strPage = replace(strPage,“</head>“,”</head><embed src=““““ &
objRS(“Audio”) & ””””> ”)
      response.write(strPage)
    else
      flAudio = CreateAudio(strClean,strURL)
      strPage = replace(strPage,“</head>“,”</head><embed src=““““ & strClean
& ””””> ”)
      response.write(strPage)
    End if
    Function CreateAudio(strText,strURL)
      Dim Connection
      Dim SQL
      Dim objvoice
      Dim objfilestream
      Set Connection = Server.CreateObject (“ADODB.Connection”)
      Connection.ConnectionString = Session (“DataConn_ConnectionString”)
      Connection.CursorLocation = 3        ‘ adUseClient
      Connection.Open
      strText = CheckEnunciation(strText)
      set objvoice = server.createobject(“SAPI.SpVoice”)
      set objfilestream = server.createobject(“SAPI.SpFileStream”)
      objfilestream.open “C:\Inetpub\wwwroot\NAH\audio\” & strURL &
“.wav” ,3
      Set objvoice.AudioOutputStream = objfilestream
      objvoice.Speak strText
      objfilestream.close
      SQL = “Insert into NAH (audio,URL,URLText) VALUES
(‘C:\Inetpub\wwwroot\NAH\audio\“ & strURL & ”.wav’,‘“ & strURL & ”’,‘“ & strText &
”’)”
      Connection.execute(SQL)
      strText = “C:\Inetpub\wwwroot\NAH\audio\test.wav”
    End function
    Function RemoveHTML(strText)
  Dim TAGLIST
  TAGLIST = “;!--
;!DOCTYPE;A;ACRONYM;ADDRESS;APPLET;AREA;B;BASE;BASEFONT;”
&_
“BGSOUND;BIG;BLOCKQUOTE;BODY;BR;BUTTON;CAPTION;CENTER;CITE;
CODE;”&_
“COL;COLGROUP;COMMENT;DD;DEL;DFN;DIR;DIV;DL;DT;EM;EMBED;FIELD
SET;” &_
“FONT;FORM;FRAME;FRAMESET;HEAD;H1;H2;H3;H4;H5;H6;HR;HTML;I;IFRAME;
IMG;” &_
“INPUT;INS;ISINDEX;KBD;LABEL;LAYER;LAGEND;LI;LINK;LISTING;MAP;MARQUEE;”
&_
```

-continued

```
"MENU;META;NOBR;NOFRAMES;NOSCRIPT;OBJECT;OL;OPTION;P;PARAM;PLAINTEXT;"
&_
"PRE;Q;S;SAMP;SCRIPT;SELECT;SMALL;SPAN;STRIKE;STRONG;STYLE;SUB;SUP;"
&_
"TABLE;TBODY;TD;TEXTAREA;TFOOT;TH;THEAD;TITLE;TR;TT;U;UL;VAR;WBR;
XMP;"
  Const BLOCKTAGLIST =
";APPLET;EMBED;FRAMESET;HEAD;NOFRAMES;NOSCRIPT;OBJECT;SCRIPT;STYLE;"
  Dim nPos1
  Dim nPos2
  Dim nPos3
  Dim strResult
  Dim strTagName
  Dim bRemove
  Dim bSearchForBlock
  nPos1 = InStr(strText, "<")
  Do While nPos1 > 0
    nPos2 = InStr(nPos1 + 1, strText, ">")
    If nPos2 > 0 Then
      strTagName = Mid(strText, nPos1 + 1, nPos2 - nPos1 - 1)
      strTagName = Replace(Replace(strTagName, vbCr, " "), vbLf, " ")
      nPos3 = InStr(strTagName, " ")
      If nPos3 > 0 Then
        strTagName = Left(strTagName, nPos3 - 1)
      End If
      If Left(strTagName, 1) = "/" Then
        strTagName = Mid(strTagName, 2)
        bSearchForBlock = False
      Else
        bSearchForBlock = True
      End If
      If InStr(1, TAGLIST, ";" & strTagName & ";", vbTextCompare) > 0 Then
        bRemove = True
        If bSearchForBlock Then
          If InStr(1, BLOCKTAGLIST, ";" & strTagName & ";",
vbTextCompare) > 0 Then
            nPos2 = Len(strText)
            nPos3 = InStr(nPos1 + 1, strText, "</" & strTagName,
vbTextCompare)
            If nPos3 > 0 Then
              nPos3 = InStr(nPos3 + 1, strText, ">")
            End If
            If nPos3 > 0 Then
              nPos2 = nPos3
            End If
          End If
        End If
      Else
        bRemove = False
      End If
      If bRemove Then
        strResult = strResult & Left(strText, nPos1 - 1)
        strText = Mid(strText, nPos2 + 1)
      Else
        strResult = strResult & Left(strText, nPos1)
        strText = Mid(strText, nPos1 + 1)
      End If
    Else
      strResult = strResult & strText
      strText = ""
    End If
    nPos1 = InStr(strText, "<")
  Loop
  strResult = strResult & strText
  RemoveHTML = strResult
End Function
Function CheckEnunciation(strText)
      Dim Connection
      Dim SQL
      Dim objRS
      Set Connection = Server.CreateObject ("ADODB.Connection")
      Connection.ConnectionString = Session ("DataConn_ConnectionString")
      Connection.CursorLocation = 3      ' adUseClient
      Connection.Open
      SQL = "SELECT Correct FROM Enunciation WHERE word = '" & strText & "'"
      set objRS = Connection.execute(SQL)
      if not(objRS.BOF) and Not(objRS.EOF) THEN
        CheckEnunciation = objRS("Correct")
      else
```

-continued

```
            CheckEnunciation = strText
        End if
        objRS.close
        connection.close
        set objRS = Nothing
        Set connection = nothing
End function
```

FIG. 8 illustrates a web page that is generated by a server to be transmitted to a client terminal. The web page includes html tags and other information. The only information that a user on a client terminal could be interested in hearing is the text "See Spot Run. In accordance with a preferred embodiment of the present patent application, the web page of FIG. 8 is filtered to remove non-audible information, as previously described. This filtering process generates a file that includes the audible information. In the case of FIG. 8, the filtering process generates a file that includes the characters "See Spot Run." This file is then converted to a speech file, for example, a .wav file, by a text to speech converter. The name of the audio file is then encoded into the web page. Referring to FIG. 9, a web page that includes the encoded reference to an audio file is illustrated. In this case, <embed src="1.wav> is included in the web page. This is a reference to an audio file, 1.wav, that includes speech that states "See Spot Run" when played. FIG. 9 is the web page that is sent to the client terminal 16 and viewed by a user.

In an alternative embodiment of the present invention, the server 10 can have an associated storage medium 50. The storage medium 50 can be any type of memory. It can also organize data in any desired fashion. For example, data can be organized into a database or a file based system.

Figure 10:
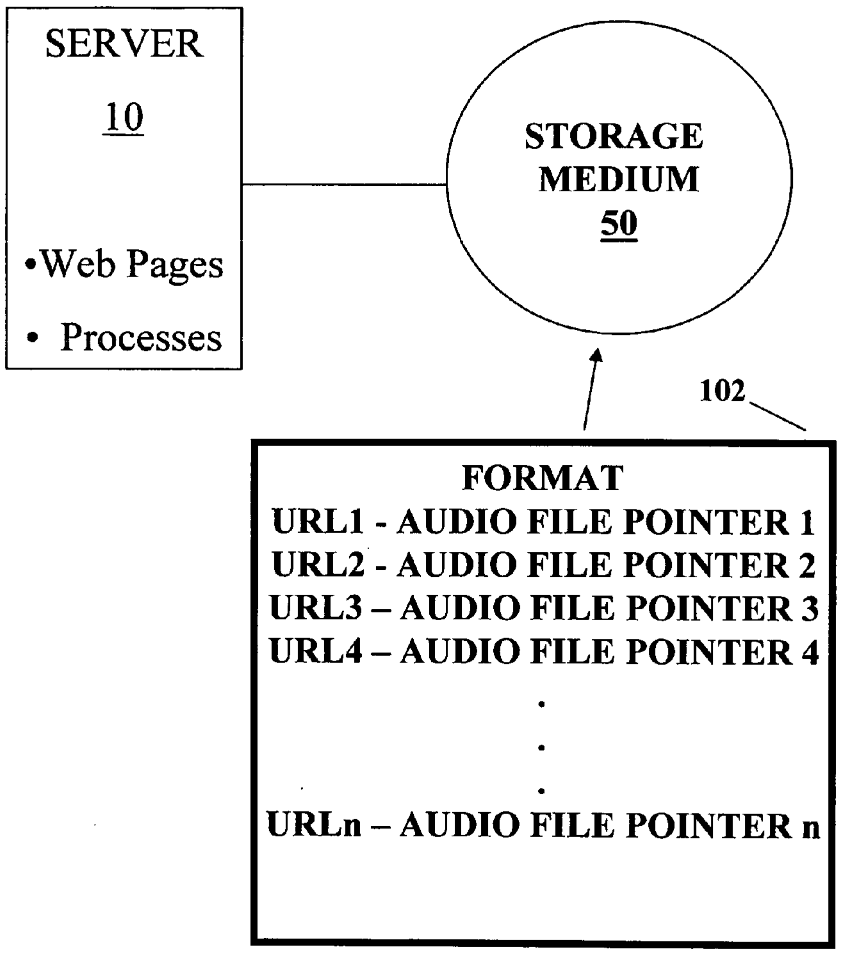
FIG. 10 illustrates a server having a storage medium having a file format in accordance with a preferred embodiment of the present invention.

In FIG. 10, the server 10 maintains data in the storage medium relating to web pages that have already been converted to web pages. This aspect of the present invention allows the server 10 to quickly access audio versions of the web pages without having to generate the audio version in real time. The implementation of this architecture is a tradeoff of processing power and memory space.

The file format of the information relating to audio versions of web pages is shown in the FORMAT box 100. The file format includes a listing of URLs. The URL is essentially a pointer to a web page on the internet. A pointer, named an AUDIO FILE POINTER, is associated with each listed URL.

After a server 10 has generated the audio version of a web page the first time, the server 10 can store the audio file, which can be a .wav file or any other audio file format, in a memory. If the server 10 does so, it stores the URL associated with the web page and a pointer that points to the memory location where the audio file is located. In this way, when a future user wants an audio file associated with a web page, the server 10 can check its memory first to see if the audio file already exists. The server 10 does so by accessing the storage medium 50 with the URL associated with the desired web page. If the URL is found in the file 102 in the storage medium 50, then the server 10 accesses the associated AUDIO FILE POINTER and then goes to the pointed to memory location to access the audio file that is an audio version of the web page. The audio version that is accessed in this way has been previously generated by the server 10.

Although FIG. 10 illustrates one embodiment of this aspect of the invention, other file formats can be used. For example, instead of storing a pointer associated with a URL, the file 102 can store the actual audio file (such as a .wav file) in association with the URL. If this format is used, the server 10 would simply access the file with the URL specified by a user at a client terminal and copy the audio file for transmission to the user.

Figure 11:
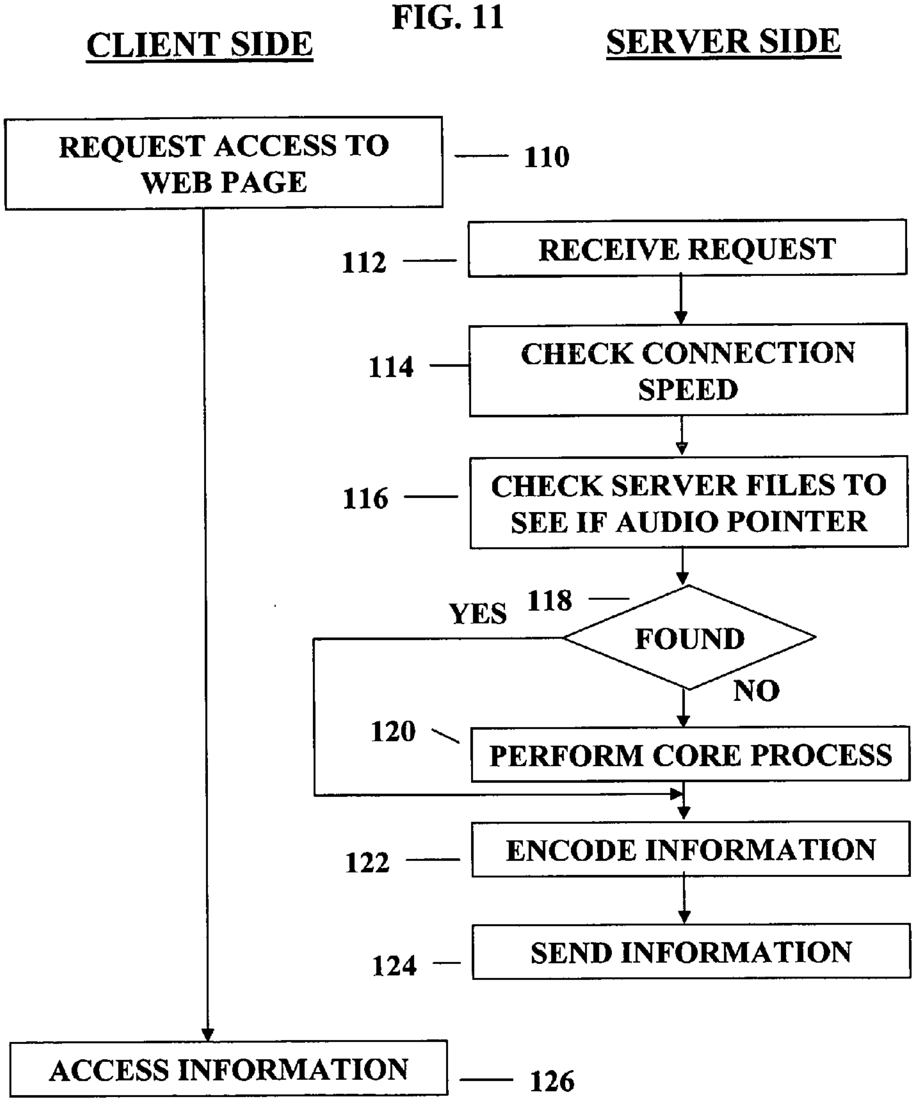
FIG. 11 illustrates the client and server processes when a server having access to a storage device having the file format illustrated in FIG. 10 is used.

FIG. 11 illustrates the client side process and the server side process in accordance with a preferred embodiment of the present invention when a server 10 has an associated memory 50 that stores a pointer to an audio file or the audio file itself. In step 110, a user at a client terminal 16 requests access to a web page. The web page has a URL associated with it which is sent with the request over the internet.

In step 112, the server 10 receives the request over the internet. In step 114, the server 10 checks the connection speed of the client terminal 16. This process has been previously discussed.

In step 116, the server 10 checks the file 102 in its memory space 50 to determine whether it has a stored version of an audio file that is representative of the web page requested by the user. If a match is found for a current web page, then the stored version of the audio file is used. If the URL associated with the requested web page is not found in step 118, then in step 120, the server 10 performs the core process previously described to generate an audio version of the web page. The core process includes steps 36, 38 and 40 as illustrated in FIG. 2.

After performing the core process, the server 10 encodes the audio file in the web page in step 120. This is performed using the previously described process. Alternatively, any other process can be used to encode the audio file onto the web page.

In step 124, the web page encoded with the audio file identification and the audio file itself are sent to the client terminal 16. In step 126, the client terminal 16 accesses the information received from the server 10. The client terminal 16 then displays the web page on its browser. In doing so, the encoded reference to the audio file is read by the browser and the browser causes the client terminal 16 to play the audio file. This browser operation is well known to those of ordinary skill in the art.

In accordance with another aspect of the present invention, a web page may include a control object that a user on a client terminal 16 can enable to cause a web page to be read. A preferred control object is a command button that states READ ME.

Figure 12:
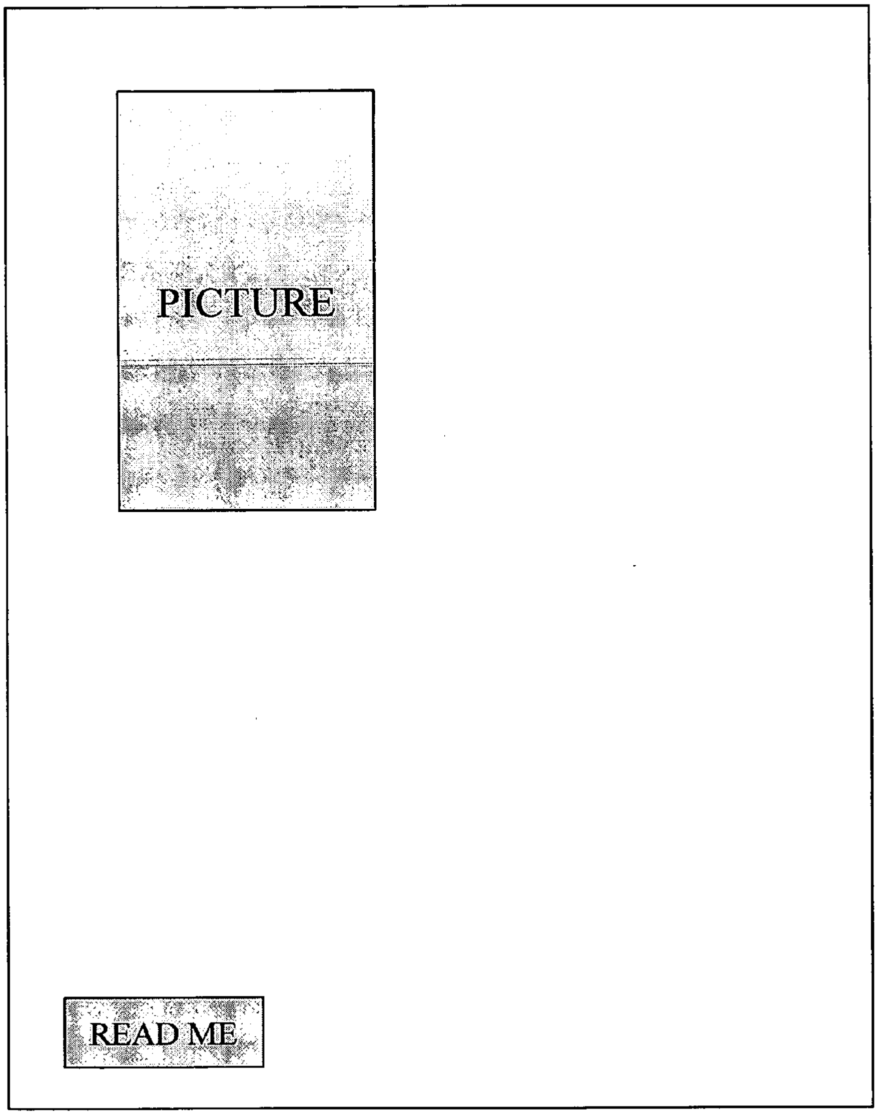
FIG. 12 illustrates a web page having a READ ME command button in accordance with one aspect of the present invention.

A web page 130 with the READ ME command button 132 is illustrated in FIG. 12. The web page 130 includes text information and graphics information. For example, the item 134 is a picture, and text is located in the areas on the web page 130 that do not have a picture or control objects. The web page also includes HTML tags, which are not shown.

When the user at the client terminal 16 is viewing the web page of FIG. 12 and wants to see an audio version of the web page, the user simply selects the READ ME command button 132. This causes the client terminal 16 to send a request to the server 10 for an audio version of the web page. The request typically includes a web page identification and a variable set to a predetermined value to indicate that the web page should be processed to generate an audio signal. For example, the request sent by a client terminal may include setting a variable READ=1, which the server interprets as requiring audio processing with an associated web page. The server 10 can then follow the steps of FIG. 2 or of FIG. 11 to generate an audio version of the web page. The server 10 can send an audio that represents the audio version of the web page by itself to the client terminal 16 which then plays the audio file. Alternatively, the server 10 can send the audio file with the web page in the manner previously discussed.

Additionally, the client terminal 16 can send the request for an audio version of the web page it is viewing to any server, such as server 12. The request would include the URL of the desired web page. The server 12 could operate in the same way previously described with respect to the server 10 in the previous paragraph.

Figure 13:
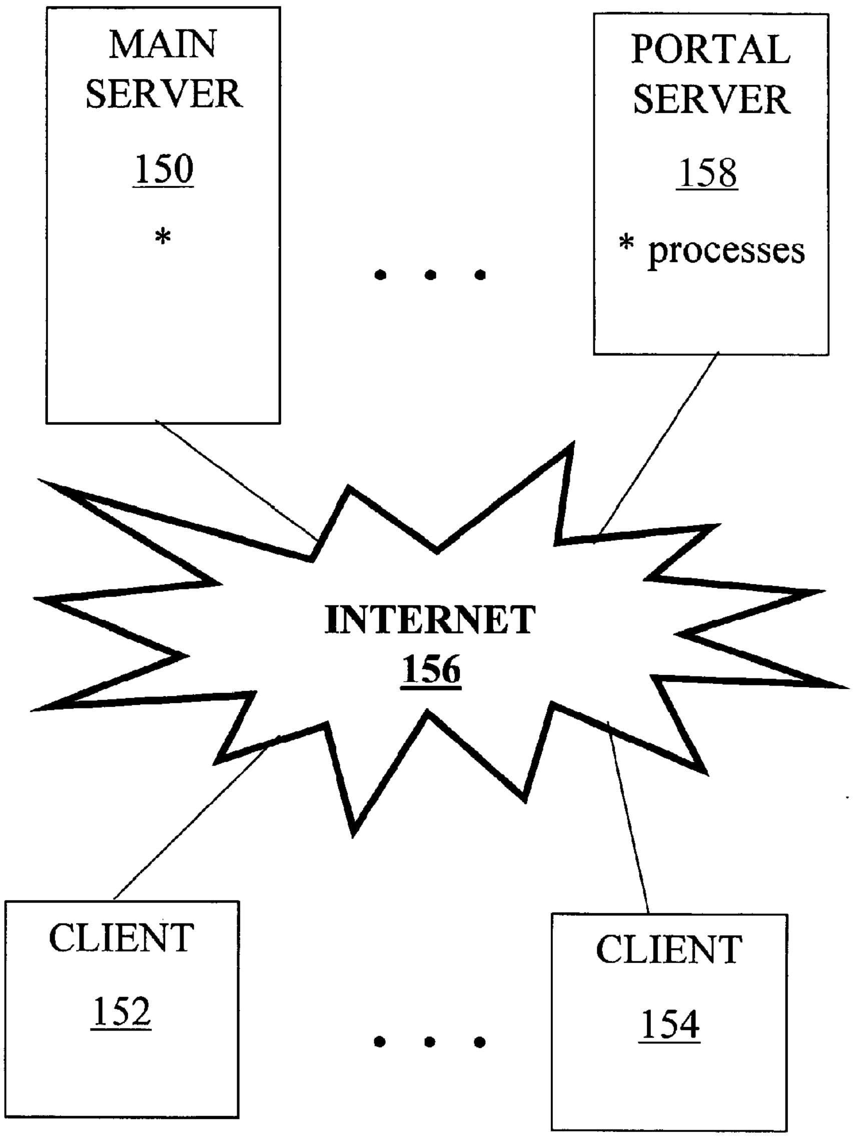
FIG. 13 illustrates an architecture of servers and client terminals in accordance with another aspect of the present invention.

Another aspect of the present invention is illustrated with respect to FIG. 13. In FIG. 13, the server 150 is a server maintained by a popular service provider to provide internet communications to a number of users 152 and 154 over the internet 156. The server 158 is a portal server set up to provide audio versions of web pages. When a user on the client terminal 152 desires to view a web page, it sends a request to the server 150 in a manner previously described. It is assumed that the user on the client terminal 152 also wants to hear an audio version of the web page, and the request to the server 150 indicates that desire.

Figure 14:
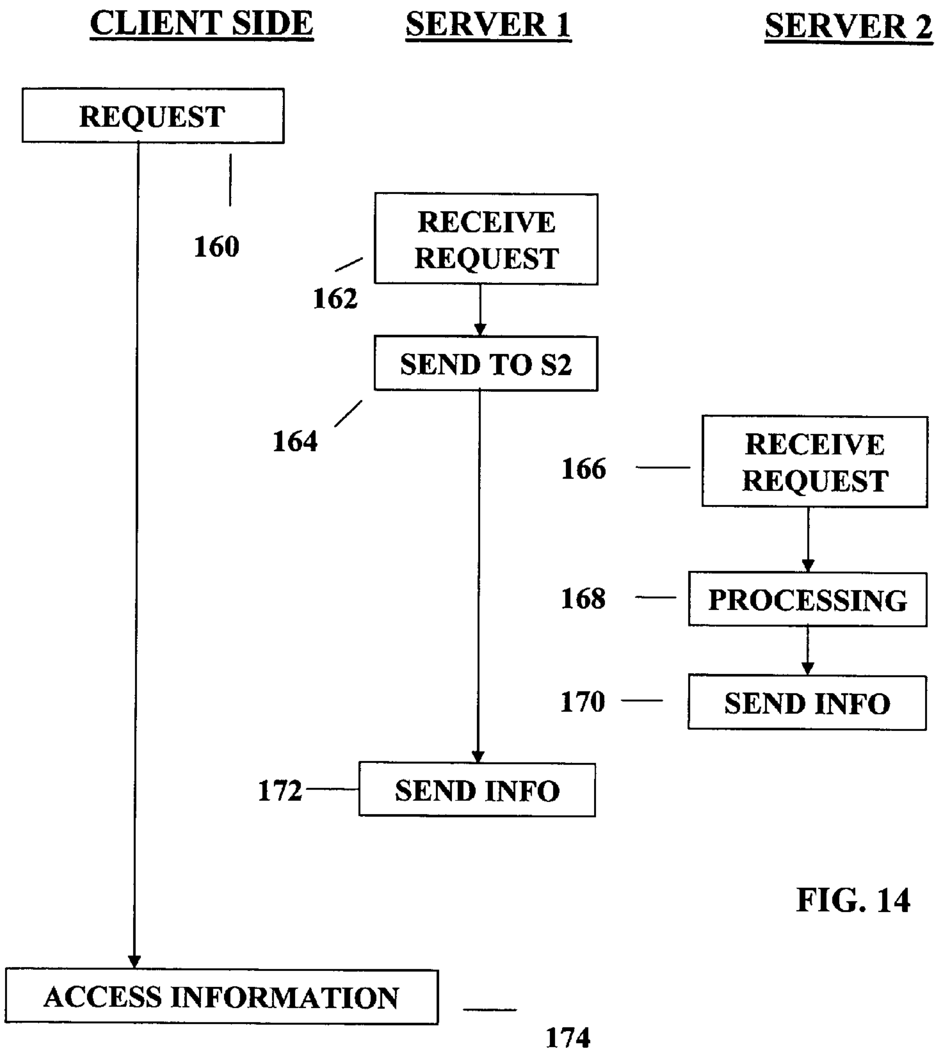
FIG. 14 illustrates the steps performed by a client terminal, by a first server and by a second server in accordance with one aspect of the present invention.

The steps performed by the system of FIG. 13 are illustrated in FIG. 14. In step 160, the client terminal 152 sends the request for a web page to the server 150. In step 162, the server 150 receives the request and generates or retrieves the requested web page. In step 164, the server 152 sends the request to the server 158.

In step 166, the server 158 receives the request from the server 152. The received request includes the URL of the requested web page. The server 158, in step 168 generates an audio version of the requested web page. The generation of the audio version results in a .wav file or another type of audio file. The server 158 transmits the audio file to the server 150 in step 170. Then in step 172, the server 150 encodes the original web page with the name of the audio file as previously described. The server 150 also transmits the encoded web page and the audio file of the readable portions of the web page to the client terminal 152. In step 174, the client terminal 152 then displays the web page and causes the audio file to be played so the user can both view and hear the web page.

Alternatively, in step 170, the server 158 could send the audio file or the audio file and an encoded web page directly to the client terminal 152. In this case, the request sent from the server 150 to the server 158 would have to include an indication of the location of the client terminal 152. The server 158 would then simply generate a message over the internet to the client terminal 152 that contained the encoded web page and the audio file.

In another alternate embodiment, the server 158 could cooperate with the server 150 to send the information to the client terminal 152. For example, the server 158 could send the audio file to the client terminal 152 and send the name of the audio file to the server 150. The server 150 would then send the encode web page to the client terminal 152. The client terminal 152 then displays the web page and causes the audio file that contains the audio version of the web page to be played.

Figure 15:
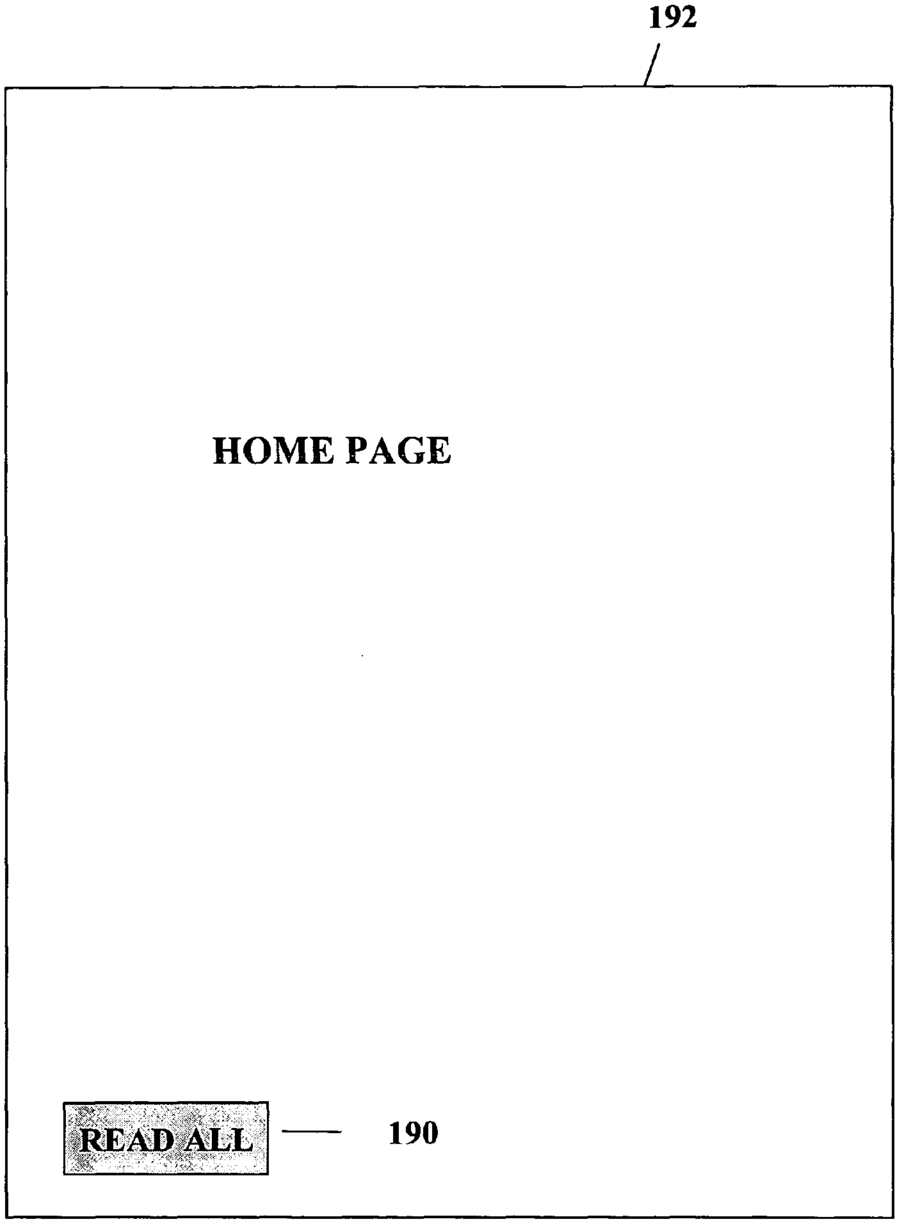
FIG. 15 illustrates a web page in accordance with one aspect of the present invention.

FIG. 15 illustrates another aspect of the present invention. In FIG. 15, a command button 190 is located on a web page 192. The command button, in accordance with a preferred embodiment of the present invention, may state READ ALL. The web page 192 is preferably the first page provided by a server to its client terminals, or one of the main pages that the server provides to its client terminals.

When a user at a client terminal wants to hear audio versions of all the web pages that are downloaded to the client terminal, the user, in accordance with one aspect of the present invention, selects the command button 190. When the command button 190 is selected, the client terminal causes a message to be sent to the server that sent the web page 192.

The message identifies the user, the client terminal address and specifies that all web pages should be provided with associated audio files that represent the audible information on the web page. When the server that sent the web page receives the message, it accesses local memory to set the preferences of that user.

Figure 16:
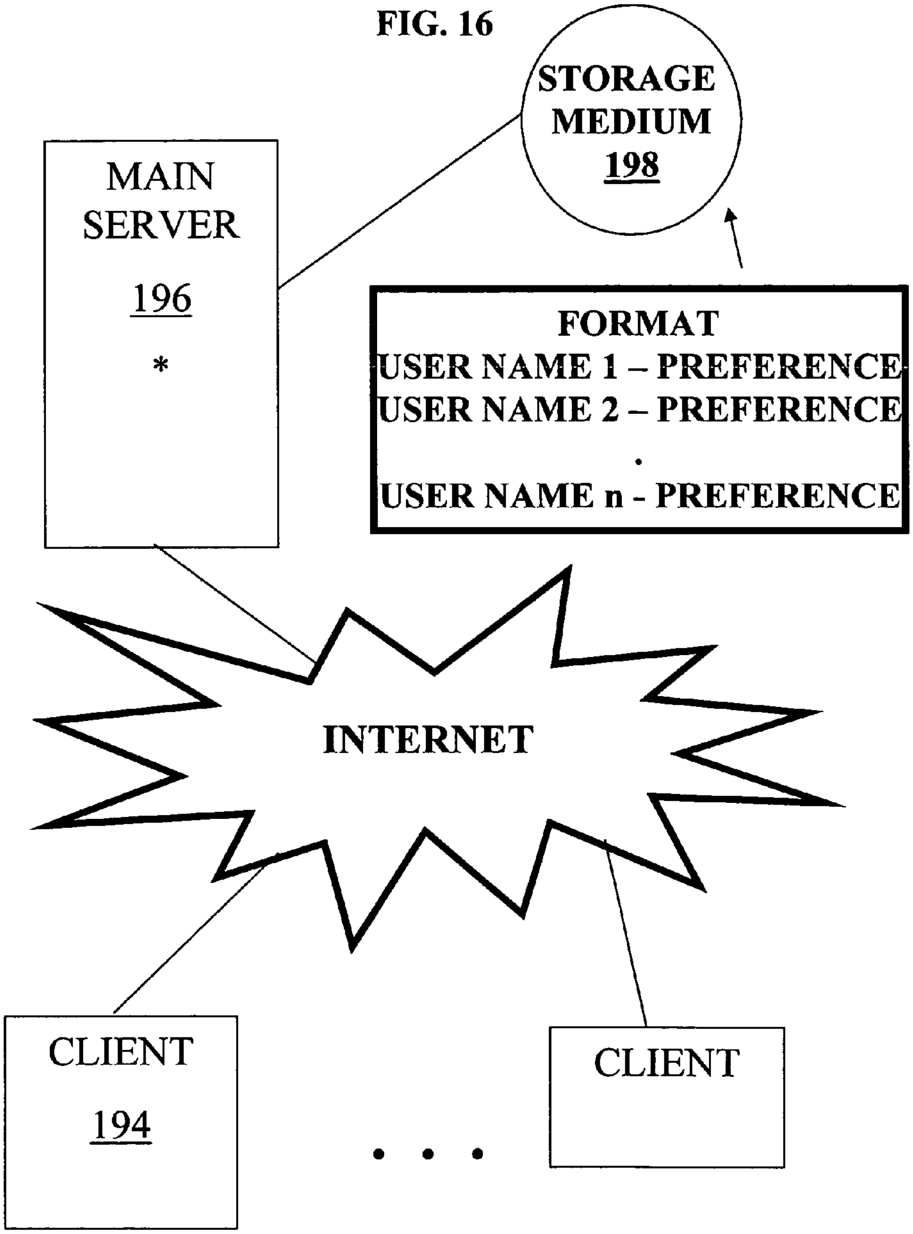
FIG. 16 illustrates a system architecture and a memory organization in accordance with one aspect of the present invention.

This is illustrated in greater detail with reference to FIG. 16. The client terminal 194 has selected the READ ALL command button on a web page be displayed and transmitted the above-describe message to the server 196. The server 196 accesses local memory 198 to set the preference of the user to indicate that all web pages should be provided with audio files representative of the audible information on the web page. As shown in FIG. 16, the memory is organized to list users names and their preference. The preference is either read all or read none.

When the user accesses a web page from the server 196 in the future, the server 196 accesses the memory 198 to determine the user's preference. If the user has indicated a "read all" preference, then the server 196 will generate the web page and will prepare an audio file representative of the audible content on the web page in accordance with the previously described embodiments of the present invention. The server 196 will then send the web page and the audio file to the client terminal so that the web page can be viewed and the audio file heard.

The server 196 can also store the preferences by client terminal instead of by user. In this case, the file format will be amended to store information concerning the client terminal and the preference associated with each client terminal. It is, however, preferred to store preference information by user.

A more elaborate table of preferences could be established to indicate the specific web pages that a user would like to hear audio version of. In this embodiment of the present invention, a database of users and specific URLs identifying web pages that a user wants to hear on the client terminal are provided. The server receives a request from a user that identifies the user and the fact that the user wants to hear audio versions of web pages. The server accesses the database to determine whether the web page is one that a user wants to hear an audio version of. If it is, then the server prepares the audio file in a manner previously described and sends it to the client terminal. If the web page is not identified in the database, then the server prepares a web page in the normal fashion and sends only the web page to the client terminal.

When a user has indicated that the preference is to "read all," the control on the web page is set to READ NONE in accordance with another aspect of the present invention. This allows a user to change his preference.

While a command button is illustrated in FIG. 15, any control object could be used. For example, a menu control could be used to set the preferences.

Figure 17:
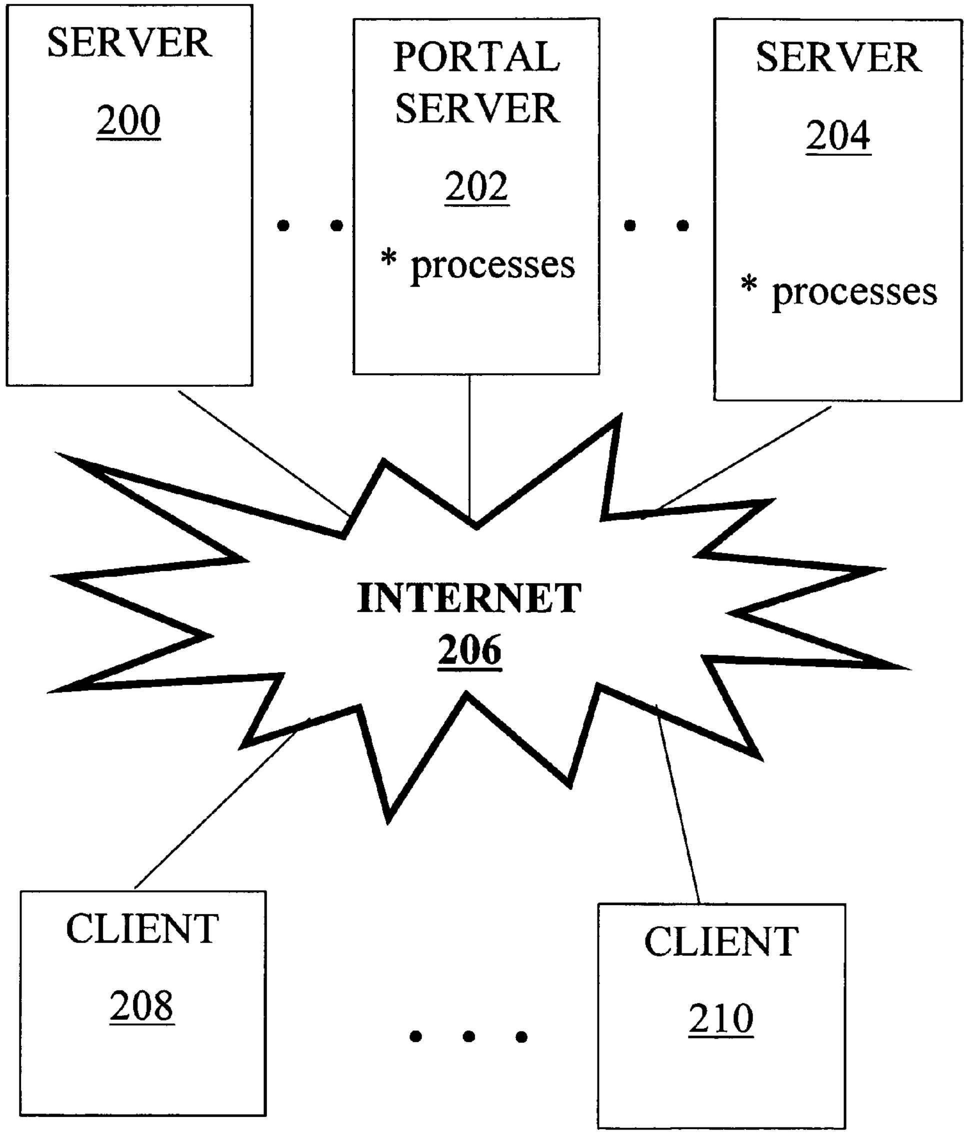
FIG. 17 illustrates a architecture useful in providing a play list web page in accordance with one aspect of the present invention.

FIG. 17 illustrates another aspect of the present invention. In FIG. 17, servers 200, 202 and 204 communicate via the internet 206 with client terminals 208 and 210. A user working on the client terminal 208 desires to view a series of web pages. For example, the user might want to read a business report from CNN, a stock market report from a market commentator and the sports report from ESPN.

Figure 18:
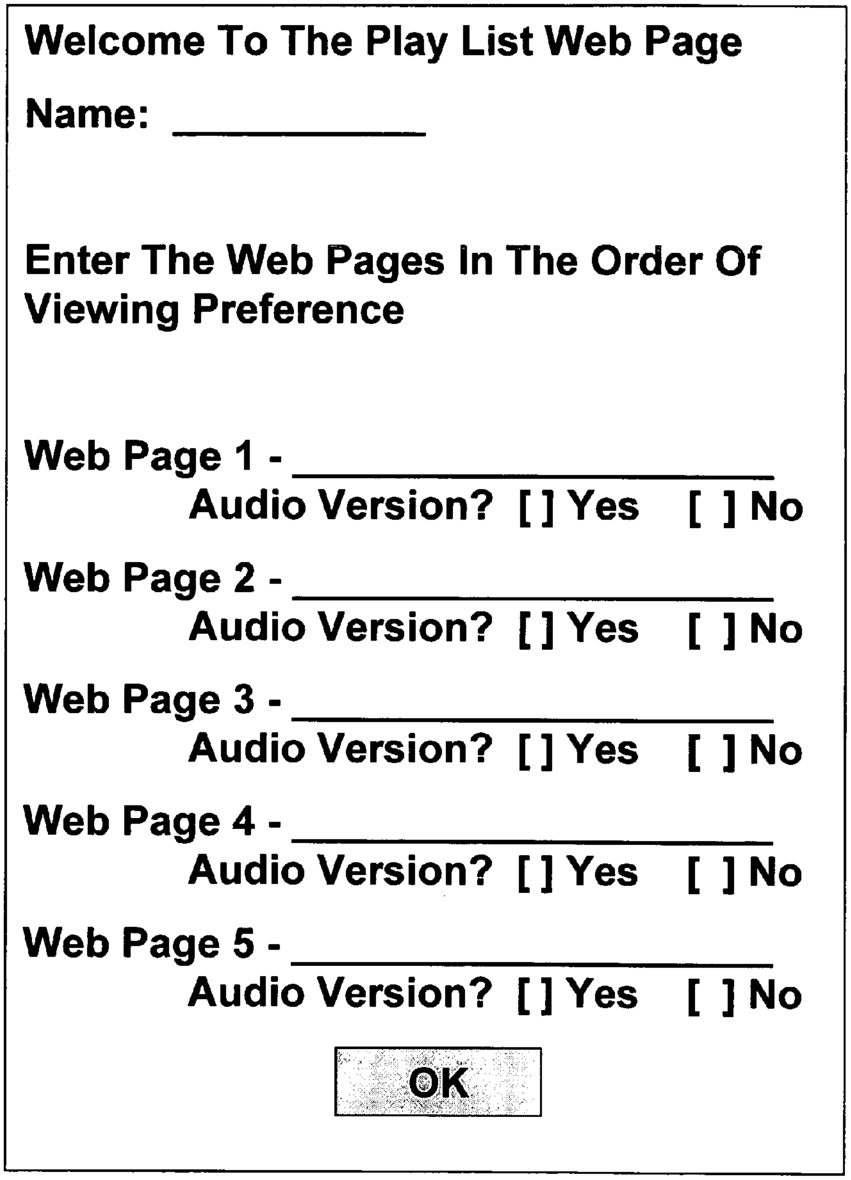
FIG. 18 illustrates a play list web page in accordance with a preferred embodiment of the present invention.

The user accesses a server 202 that has been set up to provide play lists of web pages to users. The server 202 downloads a play list web page to the client terminal 208. A preferred embodiment of the play list web page is illustrated in FIG. 18. The web page instructs the user to enter the web pages that the user would like to view. The web page can allow for the entry of a limited number of web pages, such as five in the example of FIG. 18. The entry of the web pages can be via a manual entry of a URL or the user can cut and paste the web page address. The web page of FIG. 18 also allows a user to indicate whether they would like to have an audio version of the web page presented.

Figure 19:
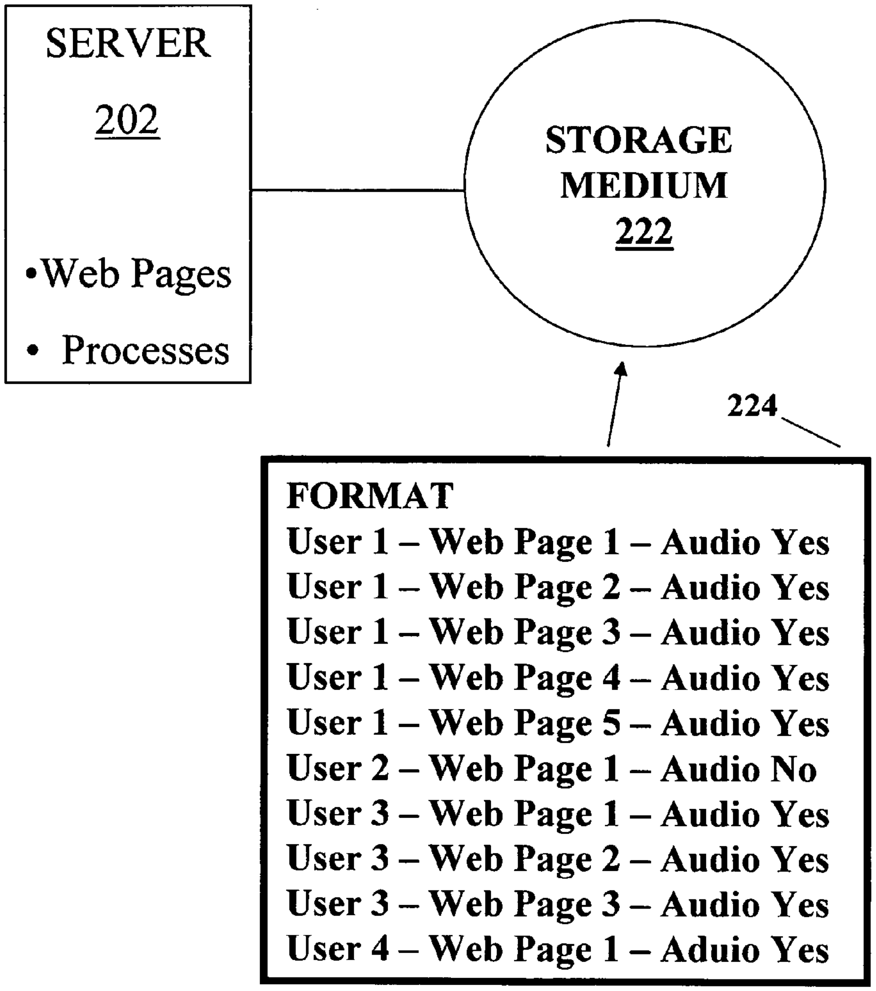
FIG. 19 illustrates a server memory that maintains a play list of web pages for a plurality of users.

Once the user has completed the entry of the list of web pages, the user selects the OK command button. This causes the client terminal to send a message to the server 202. The server 202 takes the information from the web page, including an identification of the user, the listed web pages and the indication of whether an audio version of the web page should be supplied and accesses a storage medium 222 to store the information. In FIG. 19, the information is stored in a format that includes the user name, the web page and the indication of whether an audio version of the web page should be supplied. This information is stored for each user and for each web page included in the users play list from the web page of FIG. 18.

When a user on the client terminal wants to view or hear the web pages on the play list, the user causes the client terminal 208 to send a message to the server 202. The message indicates the user's name, the location of the client terminal 208 and a command to generate a play list.

When the command is received by the server 202, the server 202 accesses its memory to see if there is a play list associated with the user named in the command. If there is one, the server 202 reads the memory to generate a list of URLs. The server 202 then uses the URLs to generate the web pages on the list.

The server 202 then transmits the web pages to the client terminal. The server 202, in accordance with a preferred embodiment of the present invention, transmits the web pages sequentially, one at a time. The server 202 can transmit all of the web pages in this manner, or can, alternatively, transmit the web pages as they are viewed at the client terminal in accordance with an established communications protocol between the server 202 and the client terminal.

The server 202 also determines whether an audio version of each web page should be generated by accessing the storage medium 222. If the server 202 determines that an audio version of a web page should be generated, it does so in accordance with the processes described earlier, and transmits and encodes the audio version of the web page as previously described.

The play list of web pages can be provided to a client terminal without audio versions of the web pages in accordance with one aspect of the present invention.

Thus, the present invention provides a user at a client terminal with the ability to view a plurality of web pages from a previously generated play list without having to individually access each web page. The present invention also provides a user at a client terminal with the ability of hear audio versions of a plurality of web pages from the previously generated play list without having to individually access each web page. Thus, for example, a user could sit at a client terminal, select an instruction and sequentially listen to or view a plurality of web pages without individually accessing each web page.

Figure 20:
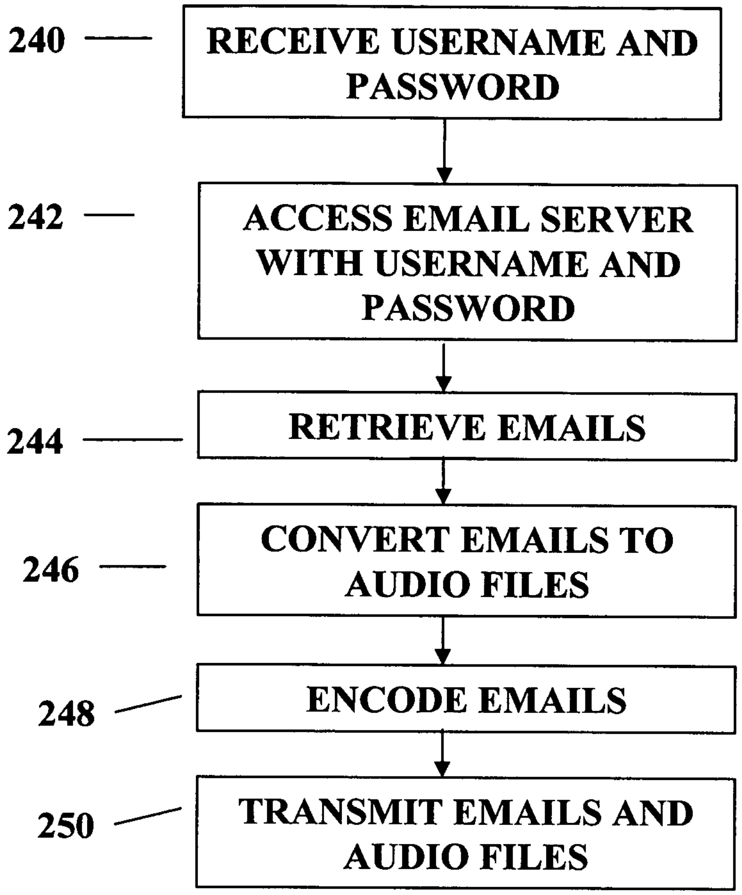
FIG. 20 illustrates the steps taken by a server to provide audio versions of emails in accordance with another aspect of the present invention.

The present invention can also provide audio versions of emails to a user at a client terminal. The process, which is implemented on an network, server-client architecture, such as on the internet or other network, is illustrated in FIG. 20.

An email server requires a user to have a username and a password. In accordance with one aspect of the present invention, as shown in step 240, the user supplies a server with the username and the password to an email account. The server, in step 242, sends a request over a network such as the internet and accesses a email server that is storing the user's email. The server accesses the email server with the username and the password that was provided by the user. In step 244, the server retrieves the emails addressed to the user.

In step 246, the user creates audio versions of each of the emails that were retrieved. The audio versions are created in accordance with a preferred embodiment of the present invention using the previously described processes and systems. Thus, for example, the steps 36, 38 and 40 discussed in FIG. 2 are performed on the emails. Further, as previously described, the audio versions are stored in any of the available audio file formats.

In step 248, the audio versions of the emails are encoded into the email in a manner previously described. Then, in step 250, the emails and the associated audio files are transmitted to the client terminal that sent the original request. Next, the client terminal displays the selected emails and plays the associated audio file so that the user at the client terminal can hear the audio version of the email.

In accordance with one aspect of the present invention, the emails are played as selected. Alternatively, the emails are automatically played by the client terminal in the sequential order they are received.

The software routines previously set forth with respect to the web pages can be used to process the emails. This is because the emails are usually transmitted with HTML tags.

In the event web pages or emails are generated without HTML tags, the filtering function to remove non-audible information can be performed with a search and replace routine. The search and replace routine should search for known non-audible information and replace it with null strings (" ").

The invention claimed is:

1. A communication system, comprising:

a first server configured to:

receive a request from a client, the request indicating a URL of a web page hosted on a second server;

utilize the URL to generate the web page;

utilize the web page to generate an audio version of the web page; and send the web page and the audio version of the web page to the client terminal.

2. The communication system as claimed in claim 1, wherein the audio version of the web page is encoded in the web page.

3. The communication system as claimed in claim 1, wherein the web page and the audio version of the web page are transmitted separately to the client terminal.

4. A method of communicating via the internet between a client terminal, a first server and a second server, comprising:

the first server receiving a request for a web page from the client terminal, the request indicating a URL of the web page hosted on the second server;

the first server utilizing the URL to generate the web; and the first server generating an audio version of the web page and sending the web page and the audio version of the web page to the client terminal.

5. The method as claimed in claim 4, wherein the audio version of the web page is encoded in the web page.

6. The method as claimed in claim 4, wherein the web page and the audio version of the web page are transmitted separately to the client terminal.

7. A method of presenting an audio version of a web page from a server to a user on a client terminal, comprising:

generating a web page, the web page having a control object selectable by the user of the client terminal;

receiving a request from the client terminal for an audio version of the web page in response to the control object being selected by the user;

generating an audio file that is an audio version of the web page in response to receiving the request; and transmitting the audio file from the server to the client terminal.

8. The method as claimed in claim 7, wherein the audio file is run on the client terminal while the web page is displayed on the client terminal.

9. The method as claimed in claim 7, wherein the control object is a command button.

* * * * *